United States Patent [19]

Dubots et al.

[11] Patent Number: 4,929,047
[45] Date of Patent: May 29, 1990

[54] METHOD OF MANUFACTURING AN OPTICAL FIBER CABLE AND A CABLE OBTAINED BY THE METHOD

[75] Inventors: Patrick Dubots, Neauphle Le Chateau; Denis Legat, Lisses; Raymond Vic, Soulages Bonneval, all of France

[73] Assignee: Societe Anonyme dite: Compagnie Generale D'Electricite, Paris, France

[21] Appl. No.: 258,411

[22] Filed: Oct. 17, 1988

[30] Foreign Application Priority Data

Oct. 16, 1987 [FR] France ................... 87 14285

[51] Int. Cl.$^5$ ............... G02B 5/16; B32B 17/00
[52] U.S. Cl. ................. 350/96.23; 156/166; 156/161; 156/289; 427/25; 427/32; 427/163; 428/378; 428/391; 505/813
[58] Field of Search ............. 505/806, 813; 427/25, 427/32, 13, 163; 156/166, 161, 289; 350/96.23; 428/378, 391

[56] References Cited

U.S. PATENT DOCUMENTS 3,437,459 4/1969 Williams ................. 428/378 X
4,009,932 3/1977 Ferrentino .................. 350/96.23
4,100,008 7/1978 Claypoole .................. 350/96.23 X
4,168,194 9/1979 Shiles ......................... 156/166
4,512,281 4/1985 Yamanishi et al. ......... 427/163 X

OTHER PUBLICATIONS

Gillette, D. J., "Powder Breakthrough in Wire-Coating Market Predicted Within Two Years", *Canadian Paint and Finishing*, June 1975, pp. 24–25.

Primary Examiner—Merrell C. Cashion, Jr.
Assistant Examiner—Jeff H. Aftergut
Attorney, Agent, or Firm—Sughrue, Mion, Zinn, Macpeak & Seas

[57] ABSTRACT

The method is intended to provide cables (10) having an optical fiber (1) and suitable for mechanically severe environments, while remaining small in section. Heretofore, the mechanical strength of optical fiber cables has been obtained by plastic structures of considerable cross-sectional area and reinforced by metal strands or by glass fibers. In the method of the present invention, the reinforcing is obtained by metal composites (3) having very high mechanical strength and very small diameter, said composites extending parallel to the fiber (1).

11 Claims, 1 Drawing Sheet

METHOD OF MANUFACTURING AN OPTICAL FIBER CABLE AND A CABLE OBTAINED BY THE METHOD

The present invention relates to a method of manufacturing an optical fiber cable, and to a cable obtained by the method.

BACKGROUND OF THE INVENTION

Numerous methods are known for manufacturing such a cable including at least one optical fiber for transmitting information together with reinforcing elements for withstanding traction, said reinforcing elements being coated together with the fiber in a sheath of insulating plastic material, and with the coating being performed by pultrusion or by co-extrusion. The reinforcing elements are generally twisted metal strands or glass fibers. Such cables generally have the diameter of several millimeters.

In some applications, cables obtained by prior art methods do not give satisfaction because they are too heavy and too bulky. For example, they are unsuitable for guiding machines such as robots over distances of several kilometers.

The object of the present invention is to implement a manufacturing method suitable for obtaining cables which are lighter and less bulky than prior art cables, while still being usable in mechanically severe environments.

SUMMARY OF THE INVENTION

The present invention provides a method of manufacturing a cable comprising at least one optical fiber and metal reinforcing elements extending parallel to said fiber, said assembly being coated with a coating of plastic material, the method including the improvements whereby:

strands having a diameter of between 0.06 mm and 0.5 mm and constituted by elementary metal filaments are selected for the reinforcing elements;

the glass fiber is coated with a substance preventing it from subsequently adhering to said plastic coating material;

said fiber is placed between a plurality of strands parallel with said fiber;

the bundle formed in this way is passed through a set of successive combs and dies in order to bring the component parts closer together while maintaining a degree of longitudinal traction on said components; and a thermoplastic or thermosetting resin is deposited on said bundle by electrostatic powdering, and is then melted by passing through an oven at a temperature of less than 250° C., with the duration of the treatment being about 1 minute.

The duration of the heating may be about one minute or less, depending on the method selected.

In preferred embodiments, each of said elementary filaments is made of a material selected from the group consisting of niobium-titanium, tantalum, niobium, titanium, and stainless steel; embedded in a material selected from the group consisting of copper, cupronickel, and aluminum; and with the diameter of an elementary fiber lying between 0.1 microns and 0.5 microns.

The glass fiber is preferably coated with silicone oil.

The thermoplastic resin used in the electrostatic powdering is preferably the resin sold under the trademark TENIDAL by ALSTHOM-I.V.A.

By implementing the method of the invention, it is possible to manufacture several tens of kilometers of optical fiber cable having a diameter lying in the range 0.5 mm and 1 mm, using an inner fiber with a diameter of 250 microns.

The cable is particularly remarkable for its mechanical properties.

BRIEF DESCRIPTION OF THE DRAWING

An embodiment of the invention is described by way of example with reference to the accompanying drawing, in which.

MORE DETAILED DESCRIPTION

Figure 1:
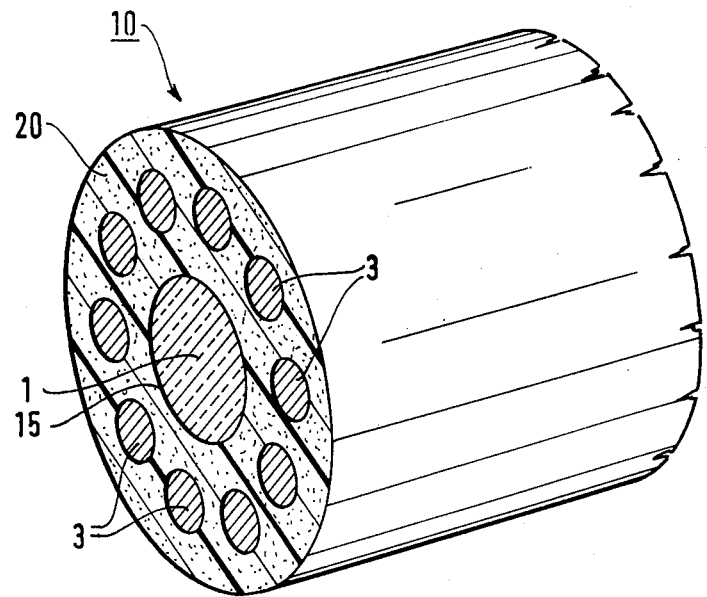
FIG. 1 is highly diagrammatic perspective view of a length of cable obtained using the method of the invention.
Figure 2:
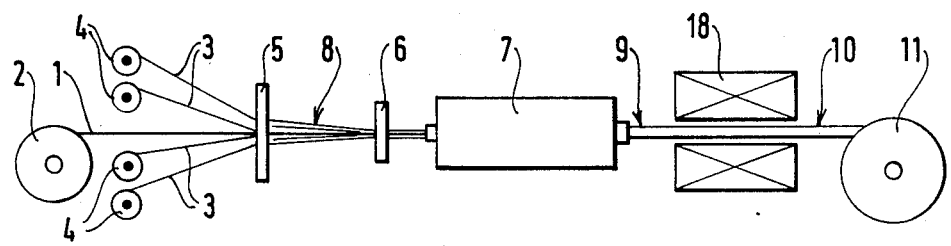
FIG. 2 is a diagram of an installation for performing the method of the invention.

As can be seen in the figures, the method begins with an optical fiber 1 wound onto a support 2 which is disposed in a central position. This fiber has a diameter of 250 microns and is constituted by a glass core and a protective covering. If the outside shape of the covering suffers from a defect, it would be impossible to apply a subsequent coating operation thereto using pultrusion or co-extrusion, whereas such a defect is of no consequence when implementing the method of the present invention, as is demonstrated below. However, it is essential for the outside surface 15 of the fiber 1 to be treated so as to ensure that there is no subsequent adherence between said surface and its plastic coating. It is therefore coated with a silicone oil, which coating substance must be capable of remaining stable up to temperatures of not less than 250° C.

The fiber 1 is disposed between nine strands 3 which are wound onto supports 4. The strands 3, which have hitherto been used for their superconducting properties, also have quite remarkable mechanical properties. Each strand 3 is constituted by tens of thousands of elementary filaments having a diameter, of about 0.5 microns. Each filament is made of niobium/titanium embedded in a cupronickel matrix having 30% nickel.

These filaments are described in detail in the publication CIGRE - Symposium 05-87 Vienne; 100-03; pages 1 to 6; B. Dalle, A. Ansart, Hoang Gia Ky, and P. Dubots: "Charact°ristiques des brins supraconducteurs utilisables en r°gime alternatif", i.e. "Characteristics of superconducting strands usable with AC".

Each strand 3 having a diameter lying between 0.06 mm and 0.5 mm, and preferably lying in the range 0.08 mm and 0.2 mm, has a breaking stress of $17 \times 10^8$ Pa.

For strands comprising several hundreds of thousands of elementary filaments having a diameter of 0.1 microns, this value may be as high as $22 \times 10^8$ Pa.

The outside surfaces of the strands 3 are merely degreased.

The bundle constituted by the strands 3 and the fiber 1 passes through a set of combs and dies shown diagrammatically at 5 and 6, so as to be bundled together tightly prior to entering an electrostatic powdering enclosure 7.

The voltage in this enclosure is greater than 50K volts, e.g. about 60K volts.

A resin powder sold under the trademark TENIDAL is used having grain diameters of less than 100 microns, and preferably of 20 microns to 80 microns. The air flow rate is 5 liters per minute.

In order to ensure that the various components of the bundle 8 do not move too far apart from one another in the enclosure 7, a longitudinal traction force is maintained on said bundle at about 50% of its elastic limit.

The bundle 9 of powder-coated threads passes immediately into an oven 18 in order to bake the resin 20 at a temperature of less than 250° C., e.g. 230° C., for a period of one minute.

Naturally, baking could take place more quickly if a higher temperature is selected, and it also depends on the heater means.

Cooling is preferably natural cooling in air.

The final cable has a diameter of 0.8 mm; cables of this nature may be made having diameters lying in the range 0.5 mm to 1 mm. The cable is wound onto a support 11.

A cable 10 in accordance with the invention is much less bulky than cables made heretofore. The method of the invention is highly flexible in use: it applies very little stress to the optical fiber, unlike applying coatings by extrusion; it is independent of thread diameter; it is suitable for use with a plurality of optical fibers together with reinforcing strands in any configuration. Naturally, precautions should always be taken to ensure that an optical fiber is to be maintained substantially on the neutral axis of the cable.

When traction is applied to the cable 10, the fiber 1 is not subjected to that traction since it does not adhere to the coating of resin 20. However, by virtue of the strands 6, the cable 10 has mechanical strength which may be as much as $7 \times 10^8$ Pa without damaging the fiber in any way. Its modulus of elasticity is greater than $8 \times 10^{10}$ Pa. Its linear coefficient of expansion is about $10^{-5}/xC$.

Optical fibers in accordance with the invention are thus suitable for use in mechanically severe environments, while nevertheless being small in section, and low in weight, thereby making it easy to use, even over long lengths.

The invention is not limited to the above-described embodiments. Without going beyond the scope of the invention, any means may be replaced by equivalent means.

We claim:

1. A method of manufacturing a cable comprising an assembly of at least one optical fiber and metal reinforcing elements extending parallel to said fiber, said assembly being coated with a coating of plastic material, the method including the improvements whereby:

strands having a diameter of between 0.06 mm and 0.5 mm and constituted by elementary metal filaments are selected for the reinforcing elements;

the optical fiber is coated with a substance preventing it from subsequently adhering to said plastic coating material;

said fiber is placed between a plurality of strands parallel with said fiber to form a bundle of component parts;

the bundle formed in this way is passed through a set of successive combs and dies in order to bring the component parts of said bundle closer together while maintaining a degree of longitudinal traction on said components; and a resin is deposited on said bundle by electrostatic powdering, and is then melted by passing through an oven at a temperature of less than 250 degrees C. for about 1 minute to form said plastic coating and solidified to encapsulate said bundle.

2. A manufacturing method according to claim 1, wherein each of said elementary filaments is made of a material selected from the group consisting of niobium-titanium, tantalum, niobium, and stainless steel; embedded in a material selected from the group consisting of copper, cupronickel, and aluminum; and with the diameter of an elementary fiber lying between 0.1 microns and 0.5 microns.

3. A manufacturing method according to claim 1, wherein said optical fiber is a glass fiber and is initially coated with silicone oil.

4. A manufacturing method according to claim 1, wherein the longitudinal traction applied to said bundle while it is being passed through said combs, dies, and an electrostatic powdering enclosure corresponds substantially to 50% of its elastic limit.

5. A manufacturing method according to claim 1, wherein the resin is one material selected from the group consisting of a thermosetting resin and a thermoplastic resin.

6. A manufacturing method according to claim 5, wherein the resin comprises powder grains having a diameter lying in the range of 20 microns to 80 microns.

7. A manufacturing method according to claim 1, wherein the electrostatic powdering is performed with a charging voltage of more than 50K volts.

8. A cable obtained by the method of claim 1, wherein a diameter of the cable lies in a range 0.5 mm to 1 mm.

9. A cable according to claim 8, comprising an optical fiber surrounded by reinforcing strands having diameters lying in a range 0.08 mm to 0.2 mm.

10. A cable according to claim 9, wherein each strand comprises several tens of thousands of elementary filaments each having a diameter of about 0.5 microns.

11. A cable according to claim 9, wherein each strand comprises several hundreds of thousands of elementary filaments each having a diameter of about 0.1 microns.

* * * * *